(12) United States Patent
Stevens et al.

(10) Patent No.: US 11,575,170 B2
(45) Date of Patent: Feb. 7, 2023

(54) METHOD FOR MANAGING THE ELECTRICAL ENERGY PASSING THROUGH A METAL-AIR BATTERY AND ASSOCIATED CELL

(71) Applicant: ELECTRICITE DE FRANCE, Paris (FR)

(72) Inventors: Philippe Stevens, Noisy Rudignon (FR); Gwenaelle Toussaint, Nemours (FR)

(73) Assignee: ELECTRICITE DE FRANCE, Paris (FR)

( * ) Notice: Subject to any disclaimer, the term of this patent is extended or adjusted under 35 U.S.C. 154(b) by 372 days.

(21) Appl. No.: 16/629,660

(22) PCT Filed: Jul. 10, 2018

(86) PCT No.: PCT/EP2018/068626
§ 371 (c)(1),
(2) Date: Jan. 9, 2020

(87) PCT Pub. No.: WO2019/011898
PCT Pub. Date: Jan. 17, 2019

(65) Prior Publication Data
US 2020/0168969 A1 May 28, 2020

(30) Foreign Application Priority Data

Jul. 10, 2017 (FR) ..................... 17 56507

(51) Int. Cl.
*H01M 12/08* (2006.01)
*H01M 12/02* (2006.01)
*H02J 7/00* (2006.01)

(52) U.S. Cl.
CPC ........... *H01M 12/08* (2013.01); *H01M 12/02* (2013.01); *H02J 7/0047* (2013.01)

(58) Field of Classification Search
None
See application file for complete search history.

(56) References Cited

U.S. PATENT DOCUMENTS

2010/0021776 A1\* 1/2010 Dougherty .......... H01M 4/0438
205/333
2011/0250512 A1 10/2011 Friesen et al.
(Continued)

FOREIGN PATENT DOCUMENTS

WO 2013/110097 A1 8/2013
WO 2014083267 A1 6/2014

OTHER PUBLICATIONS

Neburchilov et al., "A review on air cathodes for zinc-air fuel cells," Journal of Power Sources, 2010, vol. 195, pp. 1271-1291.

*Primary Examiner* — Brian R Ohara
*Assistant Examiner* — Patrick Marshall Greene
(74) *Attorney, Agent, or Firm* — Faegre Drinker Biddle & Reath LLP

(57) ABSTRACT

A method for managing the electrical energy passing through a metal-air battery comprising a cell and the associated cell comprising a negative electrode, a first positive electrode referred to as the air electrode, and a second positive electrode referred to as the power electrode. The cell further comprises a third positive electrode. In a first charging phase, a charging voltage is applied to the cell, this voltage causing current to travel between the negative electrode and the second positive electrode, the first and third positive electrodes being electrically inactive. In a second charging phase, the charging voltage causes current to travel between the negative electrode and said third positive electrode, the first and second positive electrode being electrically inactive.

9 Claims, 7 Drawing Sheets

(56) References Cited

U.S. PATENT DOCUMENTS

2011/0292574 A1* 12/2011 Besling ................ H01G 11/02
29/25.41
2012/0098499 A1 4/2012 Friesen et al.
2017/0162899 A1 6/2017 Chandra et al.

* cited by examiner

METHOD FOR MANAGING THE ELECTRICAL ENERGY PASSING THROUGH A METAL-AIR BATTERY AND ASSOCIATED CELL

CROSS-REFERENCE TO RELATED APPLICATIONS

This application is the U.S. national phase of the International Patent Application No. PCT/EP2018/068626 filed Jul. 10, 2018, which claims the benefit of French Application No. 17 56507 filed Jul. 10, 2017, the entire content of which is incorporated herein by reference.

TECHNICAL FIELD

The invention relates to the field of metal-air batteries, and more particularly to the methods for managing the electrical energy passing through these batteries during the charging and discharging phases. The invention relates equally well to a single metal-air cell or to a set of cells forming a battery.

BACKGROUND

Metal-air battery cells generally consist of a negative electrode based on a metal such as zinc, iron, or lithium coupled to an air electrode. These two electrodes are generally contact with an aqueous alkaline electrolyte.

During the discharging of such a battery, oxygen is reduced at the positive electrode and metal is oxidized at the negative electrode:

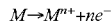  Discharging at the negative electrode:

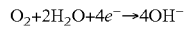  Discharging at the positive electrode:

The advantage of metal-air systems lies in the use of a positive electrode of infinite capacity, as the oxygen consumed at the positive electrode does not need to be stored in the electrode but can be taken from the ambient air. Metal-air type electrochemical generators are known for their high specific energies, which can reach several hundred W–h/kg.

Air electrodes are used for example in alkaline fuel cells, which are particularly advantageous compared to other systems because of the high reaction kinetics at the electrodes and because of the absence of noble metals such as platinum.

An air electrode is a porous solid structure, usually of carbon powder, in contact with the liquid electrolyte. The interface between the air electrode and the liquid electrolyte is a so-called "triple-contact" interface where the active solid material of the electrode (this electrode generally further comprising a catalyst), the gaseous oxidant, meaning air, and the liquid electrolyte are present simultaneously. The air electrode is usually composed of carbon powder with its high surface area, providing a large reaction surface area and therefore a high current density relative to the geometric surface area of the electrode. A large reaction surface area is advantageous in compensating for the difference between the density of gaseous oxygen and that of a liquid. For example, the molar density of oxygen in air is about 0.03 mol/L compared to water which has a density of 55 mol/L. The large surface area of the carbon makes it possible to multiply the reaction sites in the air electrode.

A description of the different types of air electrodes for zinc-air batteries is described for example in the bibliographical article by V. Neburchilov et al., entitled "A review on air cathodes for zinc-air fuel cells," *Journal of Power Sources* 195 (2010) p. 1271-1291.

When a metal-air battery needs to be recharged electrically, the direction of the current is reversed. Oxygen is produced at the positive electrode and the metal is redeposited by reduction at the negative electrode:

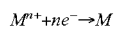  Recharging at the negative electrode:

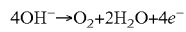  Recharging at the positive electrode:

The air electrode is not designed to be used in the reverse direction, and tends to be mechanically destroyed by the hydraulic pressure formed during the production of oxygen. This hydraulic pressure generally causes the bonds to break between the carbon grains which constitute the air electrode. This degradation reduces the life of the battery.

In addition, the catalyst added to the air electrode to improve the energy efficiency of the oxygen reduction reaction degrades at the potential required for the reverse oxidation reaction when charging the battery. The corrosion of carbon in the presence of oxygen by oxidation of the carbon is also accelerated at higher potentials.

To remedy these stability problems, particularly during charging, it has been proposed to use a second positive electrode which is only used for charging the battery. A switch then allows connecting a positive terminal of a circuit to the second electrode during charging, and connecting this positive terminal to the air electrode during discharging of the battery. Application WO 2014/083267 describes an example of a battery using such a system to preserve the air electrode from degradation in the charging phase.

This second positive electrode, used during charging of the battery, is typically composed of a metal grid of nickel or a metal alloy. This electrode may also be composed of a material capable of storing a limited amount of electrical energy without oxygen evolution. An example of such a positive electrode is an electrode composed of nickel oxide hydroxide, NiO(OH).

During charging of the battery, it has been found that this second positive electrode could also suffer degradation related to oxygen evolution. This degradation occurs less quickly than in the air electrode, but leads to disintegration of the second positive electrode which gradually degrades the performance of the battery at each cycle.

Document WO2013/110097 discloses cells for metal-air batteries which make use of a first reversible metal electrode, an air electrode, and a second reversible electrode acting as a cathode in the discharging phase and as an anode in the charging phase. This document describes a two-stage discharge in which only the second positive electrode is used and only at the beginning of the discharge, and a second stage where the air electrode is used when the voltage across the battery has dropped sufficiently to reach a threshold value. In that document, the two discharging phases are consecutive and the voltage is controlled to switch from the first stage to the second stage. However, in batteries, the voltage measurement is not a good indicator of battery power and is only used to determine the charge state. In fact, in a battery (unlike in a resistor), the voltage does not vary much as the power varies and does so non-linearly, but it depends on other parameters such as the thermodynamic potential of the electrodes, the mass transport of ions in the electrolyte, charge accumulation phenomena at the interfaces and the activation barriers related to oxidation-reduction reactions or the charge state of the electrode. As a result, the voltage measurement conducted on a battery in document WO2013/110097 does not enable satisfactory management of the electrical power passing through the battery.

Document US2011/0250512 describes a metal-air cell comprising a negative electrode, a positive air electrode, an oxygen-evolution electrode, and a high efficiency electrode enabling the implementation of standard charging and discharging phases via the air electrode, and, in one embodiment, with better efficiency via the high efficiency electrode. A metal-air cell architecture and a method for managing the electrical energy passing through a metal-air battery are therefore sought that better protect the positive electrodes during charging and that further extend the life of the batteries.

SUMMARY OF THE INVENTION

In response to the problems described above, the present invention proposes a method for managing the electrical energy passing through a metal-air battery comprising at least one cell comprising:
- a negative electrode;
- a first positive electrode forming an air electrode of the cell; and
- a second positive electrode forming a power electrode of the cell.

The cell further comprising an oxygen-evolution third positive electrode, the method furthermore comprises:
- a first cell-charging phase in which a charging voltage is applied to the cell, the charging voltage causing current to travel between the negative electrode and the second positive electrode, the first and third positive electrodes being electrically inactive; and
- a second cell-charging phase in which the charging voltage is applied to the cell, the charging voltage causing current to travel between the negative electrode and said oxygen-evolution third positive electrode, the first and second positive electrodes being electrically inactive.

By providing two distinct charging phases, each involving a different electrode, the invention makes it possible to protect the second positive electrode from deterioration occurring when oxygen is released at this electrode. Indeed, it has been observed that the charging phase of a metal-air battery generally involves a first oxidation reaction without oxygen evolution at the second positive electrode (typically of nickel or nickel oxide), during which the metal or oxide of the second electrode is converted from a first oxidation state to a second oxidation state. When most of the metal or metal oxide has been converted via this first oxidation reaction, the battery is not yet fully charged and a second oxidation reaction converts the metal or metal oxide into the second oxidation state by a second oxidation reaction involving oxygen evolution.

The inventors have thus identified that the degradation to the second positive electrode typically used to protect the air electrode (first positive electrode) from deterioration, does not cause disintegration from the very beginning of charging but more at the end of charging. The nature of the material constituting the second positive electrode seems to have a lower electrical capacity than that of the negative electrode in a metal-air battery. Thus, for the negative electrode to be fully charged it is necessary to provide More electrical energy than what is required to oxidize the material of the second positive electrode.

The invention overcomes the slow but progressive degradation of the second positive electrode by providing a third positive electrode made of a metal resistant to oxygen evolution, and by connecting this third positive electrode during a second charging phase, before oxygen is formed on the second positive electrode.

The term "power electrode" covers all conceivable materials for a second positive electrode in a metal-air battery. In particular, the invention may comprise cells in which the second positive electrodes comprise oxides governed by two different oxidation reactions in the charging phase as described above.

According to one embodiment, with the second positive electrode comprising an oxide of a metal in a given oxidation state, the method may further comprise:
switching from the first phase to the second phase upon detection of a change in the charging voltage.

The switch from the first charging phase to the second charging phase is advantageously made just before oxygen evolution starts at the second positive electrode. An indicative sign of such a change may for example be an increase in the variation of the voltage or current measured across the battery. Typically, when the first oxidation reaction of the oxide of the second positive electrode begins to terminate because most of the oxide has been converted, the dynamics of the oxidation reaction may be expressed as a decrease in the voltage across the battery (an increase in the amplitude of this voltage) or a decrease in the current flowing through the battery if the voltage is kept constant. The measurement of such a change may be a criterion for switching to the second charging phase.

According to one embodiment, the method may further comprise:
- at least during the first charging phase, measuring a voltage amplitude between the negative electrode and the second positive electrode,
- upon detecting a measurement of said voltage amplitude greater than a predetermined voltage threshold, disconnecting the second positive electrode and connecting the third positive electrode, in order to switch from the first charging phase to the second charging phase.

The voltage amplitude is measured between the negative electrode and the second positive electrode in particular because it is across these two electrodes that the charging current passes through the cell during the first charging phase.

In particular, the voltage threshold may be a voltage amplitude above which oxygen evolution occurs on the second positive electrode.

According to one embodiment, for a discharging phase of the cell in which the negative electrode is connected to a negative terminal of an electric circuit in order to supply electrical energy to this electric circuit, the method may further comprise:
obtaining information on the demand for electrical energy of said circuit, and based on the demand of the circuit, applying one of the following:
- a first operating mode for discharging the cell in which the first positive electrode is connected to a positive terminal of the electric circuit, and
- a second operating mode for discharging the cell in which the second positive electrode is connected to the positive terminal of the electric circuit.

The inventors have found that the electrical properties of the various positive electrodes of a metal-air batters do not yield the same performances for the battery. The first positive electrode, or air electrode, has a high energy density which means the possibility of providing energy over a long period of time but at moderate power levels. Indeed, the power provided by the air electrode of a metal-air battery is limited by the rate of diffusion of air in the electrode. As for the second positive electrode, it has a lower energy density than the first positive electrode, but is not limited by the rate of diffusion of air which is not a factor in the use of this electrode during discharging. This second positive electrode can thus provide greater electrical power during discharging, but for a shorter time than the first positive electrode. This second positive electrode, called the power electrode, can thus advantageously be used when there is a demand for power, while the air electrode can be used in a standard operating mode without a demand for power. The same logic can be implemented for charging the battery, thus optimizing the use of the second positive electrode in the first charging phase as it can be charged more quickly than the third positive electrode. Thus, in certain cases, it may be advantageous to favor connection of the second positive electrode when high electrical power is being supplied to the battery during charging, and to favor the third positive electrode or the first positive electrode for lower electrical power during charging, in the first charging phase of the battery.

In particular, the first operating mode may correspond to a supply of electrical power below a demand threshold of the circuit, and the second operating mode may correspond to a supply of electrical power above the demand threshold.

In particular, the method may further comprise:
measuring a voltage amplitude between the negative electrode and an electrode among the first positive electrode and the second positive electrode which is connected to the positive terminal of the circuit; and when the voltage amplitude is above a predetermined threshold voltage, the threshold voltage being representative of a demand threshold of the circuit:
selecting the second operating mode, and when the voltage is below the threshold voltage:
selecting the first operating mode.

The demand threshold of the battery during charging can be evaluated based on a monitoring of the voltage amplitude at the terminals of the battery.

In particular, the predetermined threshold voltage can be estimated at regular time intervals based on a comparison between the voltage amplitude measured between the negative electrode and the first positive electrode and the voltage amplitude measured between the negative electrode and the second positive electrode.

It has been found that the electrical properties and in particular the electrical power that the battery can provide changes over the course of the battery discharge. This available electrical power is greater at the beginning of the discharge than at the end of the discharge. It is therefore relevant to reevaluate the threshold voltage for the switching between the second positive electrode and the first positive electrode during the battery discharge in order to optimize the operation of the battery. The voltage threshold value may depend on the difference between the voltage measured across the negative electrode and the first positive electrode, and the voltage measured across the negative electrode and the second positive electrode.

Alternatively, the selection of the first or the second operating mode can be made based on the measurement of a current amplitude flowing through the battery. The first discharge operating mode is selected when the measured current amplitude is below a current threshold and the second discharge operating mode is selected when the measured current amplitude is above the current threshold.

The invention may in particular be implemented as a computer program product comprising a series of instructions stored on a storage medium for execution by a computer or a dedicated device, said program being configured to execute the method set forth above.

The invention also relates to a cell for a metal-air battery, comprising:
a negative electrode;
a first positive electrode forming an air electrode of the cell;
a second positive electrode forming a power electrode of the cell;
a third positive electrode forming an oxygen-evolution electrode of the cell,
the cell being characterized in that the second positive electrode is positioned between the negative electrode and the first positive electrode.

According to a preferred embodiment, the third positive electrode is also positioned between the negative electrode and the first positive electrode.

The invention also relates to a cell for a metal-air battery comprising two sets of positive electrodes as described above, arranged symmetrically one on each side of the negative electrode.

The original architecture of the metal-air battery of the present invention makes it possible to effectively preserve the second positive electrode from degradation by providing a third positive electrode preferably for the reactions involving oxygen evolution during charging. The second positive electrode can have a longer life and in particular can be used for fast charging or for providing greater electrical power during discharging than the first positive electrode.

According to one embodiment, the second positive electrode may be a metal electrode comprising a compound having a more positive oxidation-reduction potential than the oxidation-reduction potential of a metal of the negative electrode.

According to one embodiment, the second positive electrode may be a metal electrode comprising a compound selected among: nickel oxide hydroxide, silver oxide, manganese oxide, and a mixture of these compounds.

These materials have the special characteristic of offering greater electrical power than the air electrode. In addition, these materials have a more positive oxidation-reduction potential than that of the constituent metal of the negative electrode. These materials also have a more positive oxidation-reduction potential than the air electrode.

According to one embodiment, the third positive electrode may be a metal grid made of a compound selected among: steel, nickel, titanium.

This metal grid may also be covered with a catalyst, for example such as a perovskite material, to reduce oxygen evolution overpotentials.

According to one embodiment, the second positive electrode may be configured to have an energy capacity substantially corresponding to one third of the energy capacity of the negative electrode.

Such an enemy capacity ratio makes it possible to offer good performance in energy, power, and charging speed of the battery.

The invention may also relate to a metal-air battery comprising at least one cell such as those presented above.

BRIEF DESCRIPTION OF THE DRAWINGS

The method which is the object of the invention will be better understood by reading the following description of some exemplary embodiments presented for illustrative purposes and in no way limiting, and by examining the following drawings in which.

For clarity, the dimensions of the various elements shown in these figures are not necessarily in proportion to their actual dimensions. In the figures, identical references correspond to identical elements.

DETAILED DESCRIPTION

The present invention proposes a novel cell architecture for a metal-air battery which makes it possible to increase their life as well as their electrical performance. The invention also proposes a method for managing the electrical energy passing through a metal-air batter composed of at least one cell that protects the positive electrodes of the battery and extends its life.

In order to protect a positive electrode used during the recharging of a metal-air battery, the invention proposes adding a third positive electrode used preferably when oxygen is produced during Charging of the battery.

Metal-air batteries typically consist of a negative electrode of a metal such as zinc, lithium, or iron. The metal-air batteries described for example in document WO 2014/083267 use, in addition to a first positive electrode called an air electrode, a second positive electrode which is used during charging of the battery.

The second positive electrode may typically be of a metal such as nickel, silver, or stainless steel. This electrode could also be composed of a material capable of storing a limited amount of electrical energy without oxygen evolution. An example of such a positive electrode is an electrode composed of nickel oxide hydroxide, NiO(OH). This electrode is used for the charging phase so that oxygen evolution does not occur within the fragile structure of the air electrode made of carbon powder.

Figure 1A:
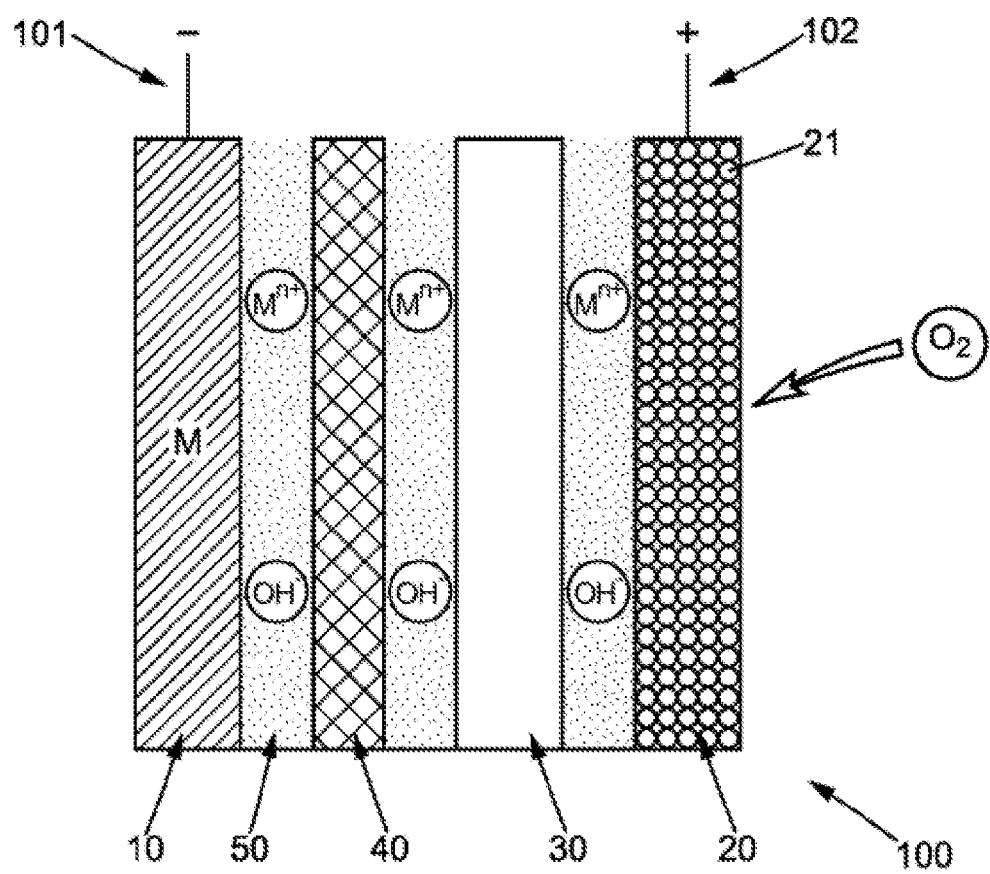
FIG. 1A is a schematic representation of a metal-air battery cell comprising a third positive electrode according to the invention.
Figure 1B:
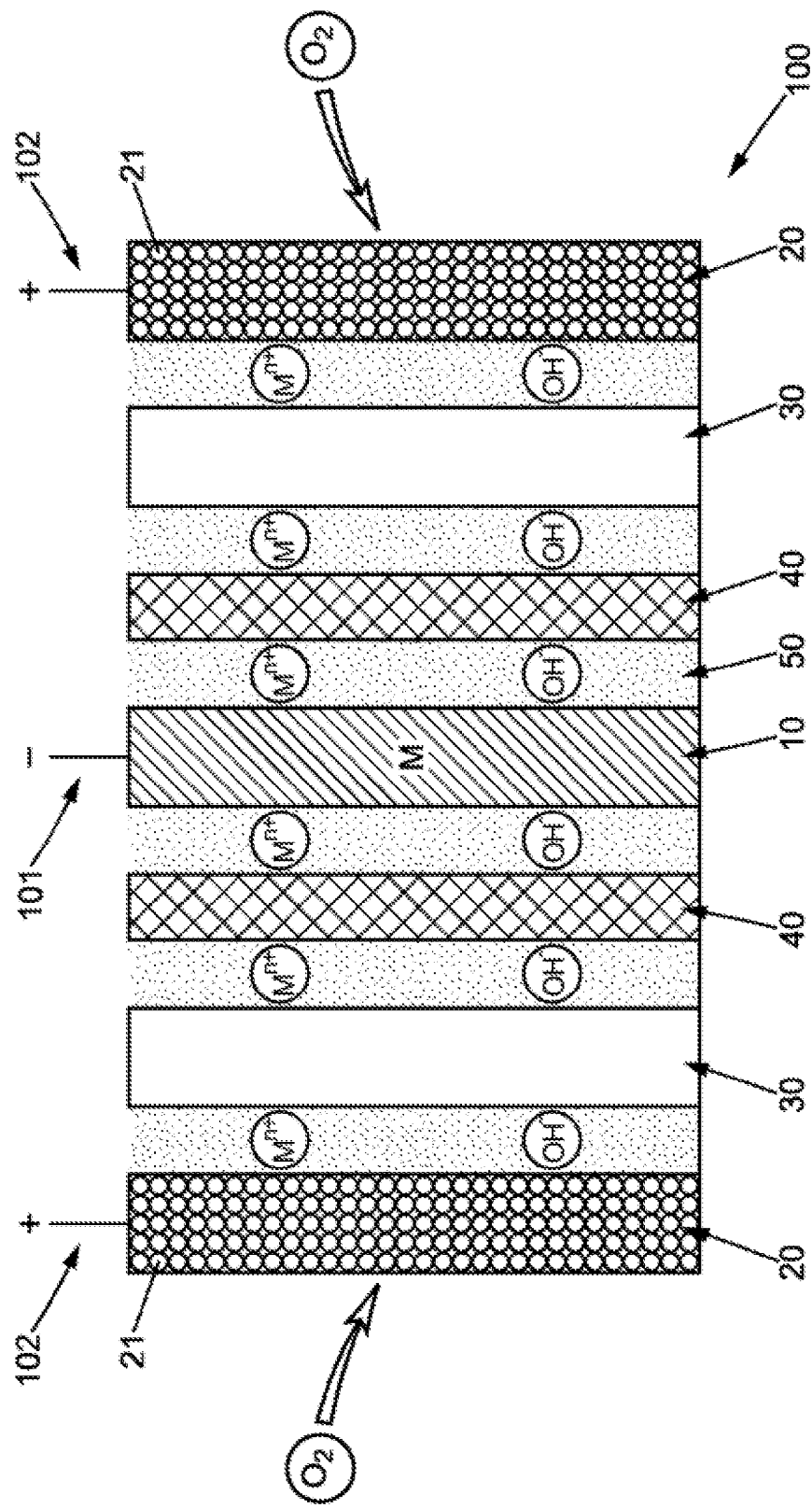
FIG. 1B is a schematic representation of a symmetrical metal-air battery cell comprising two sets of positive electrodes according to FIG. 1A which share their negative electrode.

However, to prevent the oxygen evolution from progressively deteriorating the second positive electrode, which may also be subject to a disintegration phenomenon leading to lower electrical performance of the battery over time, the invention proposes an original battery architecture according for example to the structure shown in FIG. 1A or 1B.

FIG. 1A represents a cell 100 of a metal-air battery comprising a negative electrode 10, an electrolyte 50 of strongly basic pH, typically of a value greater than or equal to 14, and a first positive electrode 20 forming an air electrode. The air electrode comprises carbon grains 21 in its structure. In addition, the cell 100 comprises a second positive electrode 30 forming a power electrode of the battery comprising the cell 100 and a third positive electrode 40 forming an oxygen-evolution electrode of the cell 100.

The negative electrode is intended to be connected to a negative terminal 101 of the battery, and the air electrode is intended, at least in the discharging phase, to be connected to a positive terminal 102 of the battery. Ions $M^{n+}$ of the metal M constituting the negative electrode flow in the electrolyte between the electrodes connected at the terminals. The electrolyte also comprises a high concentration of hydroxyl ions $OH^-$.

The inventors have noticed that the second positive electrode 30 also undergoes degradation during the charging phases, although this is slower than that which the air electrode would undergo if the first positive electrode 20 (the air electrode) was used during charging.

To limit wear and degradation of the second positive electrode 30 over time, and to increase the battery life, the invention proposes providing two distinct charging phases: a first charging phase during which the second positive electrode 30 is connected to the positive terminal 102 of the battery, and a second charging phase during which the third positive electrode 40 is connected to the positive terminal 102 of the battery. During the first charging phase, the charge current passing through the battery results in oxidation of the second positive electrode 30 but for a shorter duration than what would result in a degradation of said electrode. The second charging phase gives rise to oxygen evolution on the third positive electrode 40, which preserves the second positive electrode 30 from the harmful consequences of this significant production of oxygen during charging.

It has been observed that the use of metal oxides in the second positive electrode 30 could be of interest for further increasing the electrical performance of a metal-air battery. This second positive electrode 30, generally made of a metal such as nickel, is sometimes composed of an oxide such as, for example, nickel oxide hydroxide (NiOOH) using the Ni(II)Ni(III) pair.

It has been found that the use of nickel oxide hydroxide (NiOOH) using the Ni(II)/Ni(III) pair in the material of the second positive electrode 30 has advantages from an electrical standpoint. Indeed, the nickel oxide hydroxide provides more power than the air electrode. The air electrode offers higher energy densities than those accessible with a nickel oxide hydroxide electrode but is limited by the rate of diffusion of air in the electrode structure which reduces the power that can be provided by a battery using only the first positive electrode 20 in the discharging phase.

The use of a second positive electrode 30 of nickel oxide hydroxide offers the possibility of combining the advantages of the discharging cycle duration of metal-air batteries (accessible due to the high energy density of air electrodes) with the power performances of metal-nickel batteries. A metal-air battery cell using a metal oxide such as nickel oxide hydroxide as a second positive electrode forms a "metal-nickel-air" hybrid cell.

In the discharging phase, the following reaction is observed on the second positive electrode 30:

$$NiO(OH)+H_2O+e^- \rightarrow Ni(OH)_2+OH^-$$ <span style="float:right">(reaction a)</span>

Such a battery can allow more refined management of the power and electrical energy passing through the battery. When a standard demand for power reaches the battery in the discharging phase, the first positive electrode 20 can be connected to the positive terminal. For larger power draws, it is possible to connect the second positive electrode of nickel oxide hydroxide.

The electrical capacity (expressed in mAh/cm$^2$) of the second positive electrode of nickel oxide hydroxide turns out to be lower than that of the negative electrode 10. One consequence of this difference in capacity is that recharging the cell requires two oxidation reactions at the second positive electrode 30. In a first oxidation reaction, the nickel in oxidation state (II) is converted into nickel in oxidation state (III) according to the reaction:

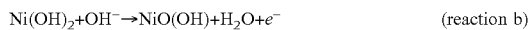
(reaction b)

When the nickel has changed its oxidation state, a second oxidation reaction takes over to continue charging the negative electrode 10 (this negative electrode typically being of zinc, iron, or lithium), until the battery is completely charged. This second reaction converts the hydroxyl ions of the electrolyte 50 into oxygen according to the conventional oxygen evolution reaction:

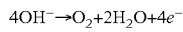

Separating the charging of a metal-air battery into two phases as described above, by providing a first phase using the second positive electrode 30 then a second phase using a third positive electrode 40, is of particular interest when the second positive electrode 30 is composed of an oxide which undergoes two successive oxidation reactions as described above. It is then relevant to provide a switch from the first charging phase to the second charging phase when the first oxidation reaction (reaction b) has converted most of the metal of the oxide from a first oxidation state to a second oxidation state.

The example described above can typically concern a second positive electrode 30 made of nickel oxide hydroxide. However, other compounds may be used, for example such as silver oxide or manganese oxide. The second positive electrode 30 is typically a compound having a more positive oxidation-reduction potential than the oxidation-reduction potential of the metal of the negative electrode (typically zinc, iron, or lithium). It is further advantageous to provide a material for the second positive electrode 30 having a more positive oxidation-reduction potential than the oxidation-reduction potential of the air electrode.

Figure 2:
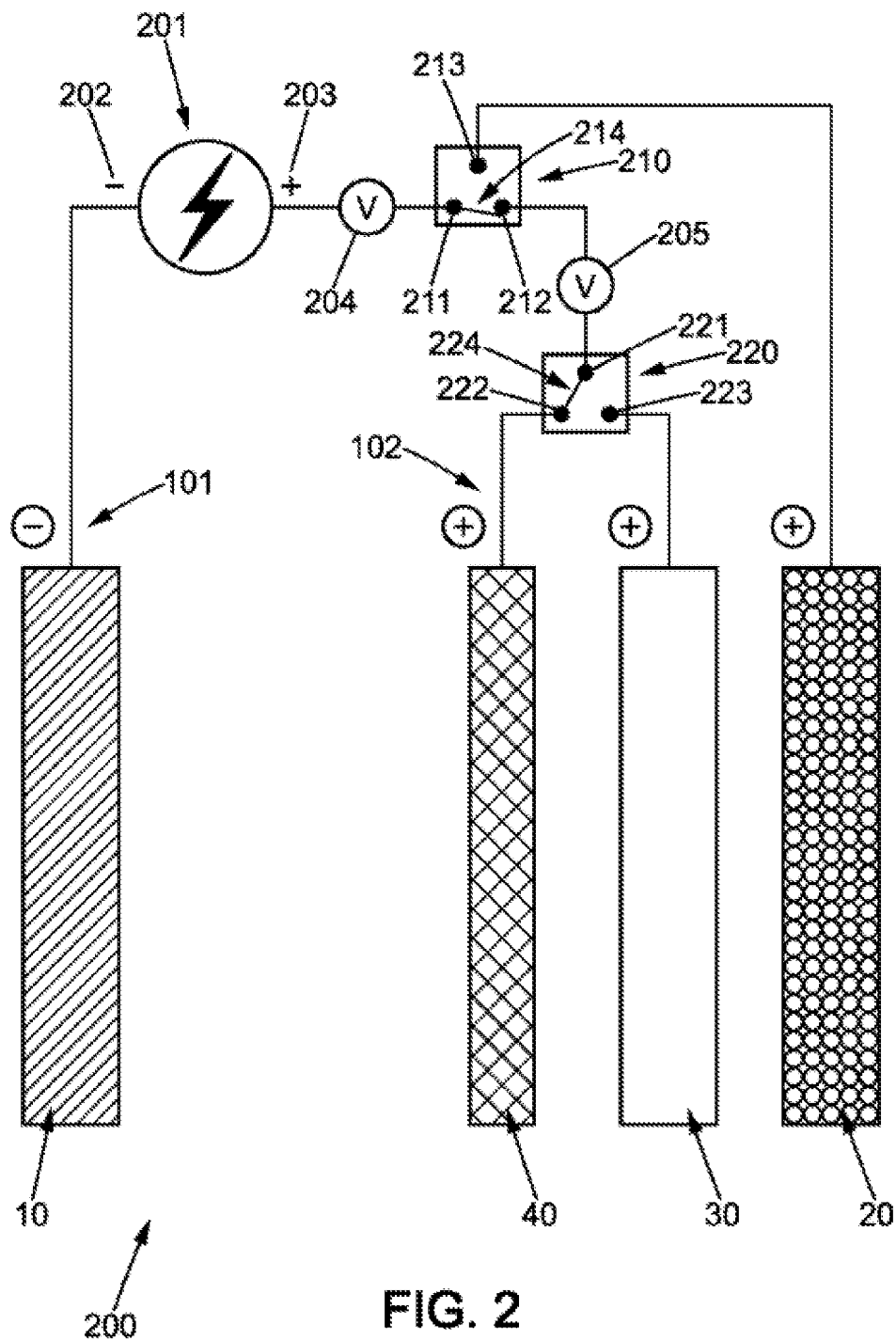
FIG. 2 is a schematic representation of an electrical connection which allows managing the electrical energy passing through a metal-air battery cell according to the invention.

The implementation of the charging and discharging method may be based on the use of a system of relays or any type of switch such as those shown in FIG. 2.

FIG. 1B represents a symmetrical cell (100) of a metal-air battery comprising two sets of positive electrodes according to FIG. 1A which share their negative electrode. The symmetrical cell comprises a negative electrode 10, an electrolyte 50 of strongly basic pH, typically of a value greater than or equal to 14, and, on each side of the negative electrode 10, a set of positive electrodes comprising a first positive electrode 20 forming an air electrode, a second positive electrode 30 forming a power electrode of the battery comprising the cell 100, and a third positive electrode 40 forming an oxygen-evolution electrode of the cell 100.

Thus, according to one particular embodiment, the first, second, and third positive electrodes are positioned symmetrically in the cell (100) around the negative electrode 10.

FIG. 2 schematically represents a negative electrode 10, a first positive electrode 20 (air electrode), a second positive electrode 30 (called the power electrode), and a third positive electrode 40 (typically a metal grid made of a metal, preferably a pure metal such as nickel or silver. The electrodes of FIG. 2 are of materials that are stable in the highly basic medium of a metal-air battery electrolyte.

The battery 200 is connected by its negative 101 and positive 102 terminals to a circuit that supplies power to the battery or consumes the energy supplied by the battery. In FIG. 2, the circuit 201 is supplying power to charge the battery. The negative terminal 202 of the circuit 201 is connected to the negative electrode 10, while the positive terminal 203 of the circuit 201 is connected to a positive electrode of the battery 200. A first switch 210 enables selecting a connection between the positive terminal 203 of the circuit 201 and the first positive electrode 20 or one among the second positive electrode 30 and third positive electrode 40.

This first switch 210 comprises three connection points 211, 212, 213, with a member 214 enabling the connection of connection point 211 to either of points 212 or 213.

A first measuring device makes it possible to monitor an electrical parameter of the battery such as a current, an electric potential, or a voltage, upstream of the first switch 210, in order to compare it with a threshold value to enable determining when the first switch must switch from the air electrode to one of the other two positive electrodes. The first measuring device may be a current sensor or a voltmeter 204, for example.

A second switch 220 placed downstream of connection point 212 makes it possible to select an electrode among the second positive electrode 30 and the third positive electrode 40. This second switch 220 also comprises three connection points 221, 222, 223 and a member 224 enabling the connection of connection point 221 to one among the second positive electrode 30 connected to connection point 223 and the third positive electrode 40 connected to connection point 222.

A second measuring device makes it possible to monitor an electrical parameter of the battery, for example such as a current, an electric potential, or a voltage, upstream of the second switch 220 and downstream of the first switch 210. This electrical parameter is compared to a threshold value to enable determining when the first switch must switch from one electrode to another. The second measuring device may for example be a current sensor or a voltmeter 205.

The use of a first switch 210 and a second switch 220 makes it possible to implement the two-phase charging method of the invention and also allows more relevant management of the delivery of electrical energy by the battery 200 during the discharging phase.

Figure 3:
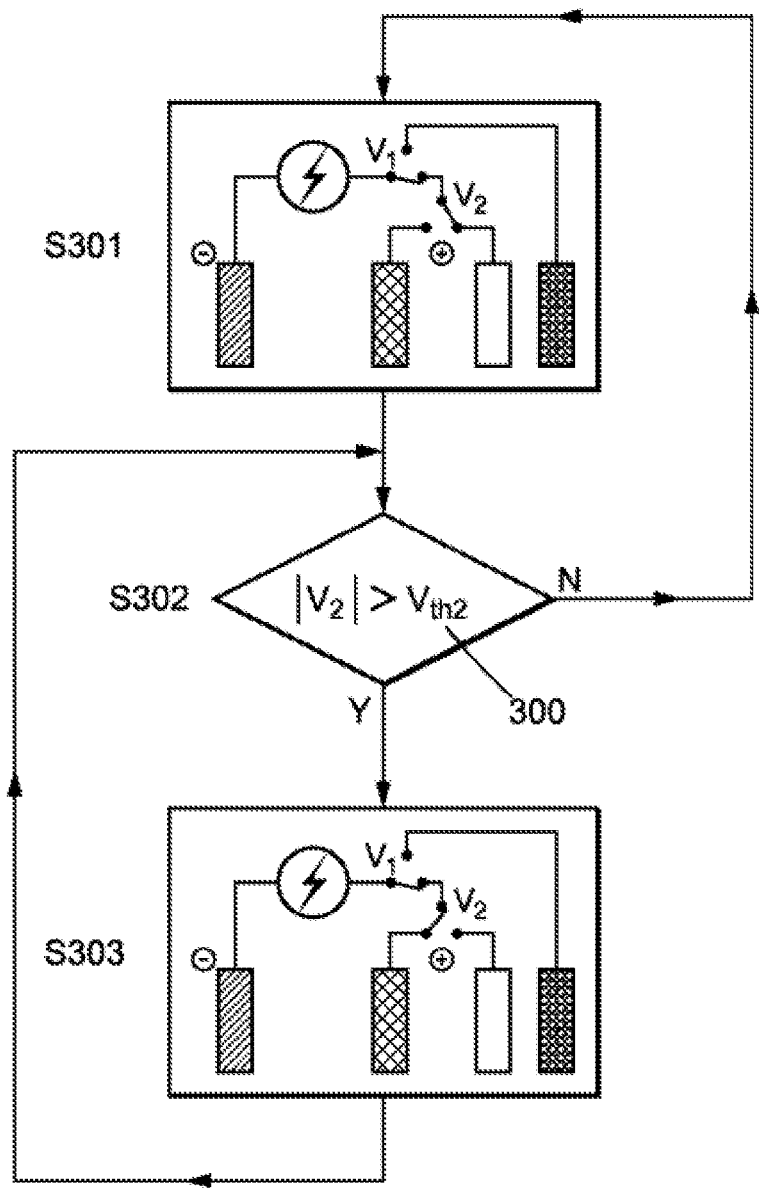
FIG. 3 is a flowchart representing a method for charging a metal-air battery, comprising two charging phases according to the invention.

FIG. 3 schematically represents a flowchart in three steps for charging a cell 100 of a metal-air battery 200 according to the invention.

Initially, the first 210 and second 230 switches are configured so that the second positive electrode 30 is connected to the positive terminal 203 of a circuit 201 providing electrical energy to the battery. The first step S301 therefore corresponds to beginning to charge the battery, which preferably first makes use of the second positive electrode 30. This second positive electrode 30 may in particular be recharged by the oxidation reaction b) mentioned above when the second positive electrode 30 comprises nickel oxide hydroxide. Thus, in the first charging phase S301, when the second positive electrode 30 comprises an oxide such as nickel oxide, no oxygen evolution takes place on the electrode, which protects it from premature deterioration.

As indicated by step S302, a voltage amplitude measured by the second measuring device, for example the voltmeter 205 of FIG. 2, is compared with a voltage threshold Vth2, 300. This voltage threshold is the voltage amplitude above which oxygen evolution occurs on the second positive electrode. One way of determining this voltage threshold consists in particular of observing a variation in the rate of increase of the voltage amplitude measured by the voltmeter 205. Such a voltage variation is the sign indicating that most of the metal of the electrode has been converted from a first oxidation state to a second oxidation state (according to reaction b) and that the second oxidation reaction with oxygen evolution is about to begin.

This variation is usually expressed as a sudden variation in the voltage across the cell or the current flowing through the cell.

For a zinc-air battery cell with a second positive electrode of nickel oxide hydroxide and a third positive electrode of nickel metal, the voltage threshold 300 can typically be comprised between 1.5V and 2.5V, and preferably is set at 1.9V. The value of this voltage threshold 300 depends in particular on the metal of the negative electrode 10 (for example zinc, iron, or lithium) and on the composition of the second positive electrode 30.

As long as the value of the voltage V2 measured by the second measuring device (voltmeter 224 in FIG. 2) corresponds to an amplitude lower than that of the voltage threshold 300, the charging occurs on the second positive electrode 30. When the measured voltage amplitude becomes greater than the voltage threshold 300, the second switch 220 disconnects the second positive electrode 30 from the positive terminal 203 of the circuit 201 and connects the third positive electrode 40 to this positive terminal 203, as illustrated in step S303 of FIG. 3. This step S303 corresponds to the second charging phase of the method according to the invention.

As the electric power supplied to the battery during charging can undergo fluctuations, for example a sudden supply of high electrical power, it may be advantageous to provide a continuous comparison of the voltage V2 to the voltage threshold 300.

In some exemplary applications of the present invention, the circuit 201 may comprise a photovoltaic panel or an electric vehicle accumulator, for which the charging electrical power fluctuates over time. The level of sunshine can generate power spikes in the circuit 201. Similarly, in an electric vehicle, braking can be an opportunity for recovering the high power generated during a brief period of time. When such events occur, it is advantageous to give preference to charging the second positive electrode 30 which is able, particularly when composed of a metal oxide, to offer faster charging than the third positive electrode 40. Proceeding in this manner during brief periods of high power being supplied during charging limits the negative effects of oxygen evolution on the second positive electrode 30, but reduces the charging time.

In addition, a variant in the charging method can be envisaged in which the third positive electrode 40 or the first positive electrode is connected to the positive terminal 203 of the circuit 201 when charging begins, so that the second positive electrode 30 is only connected when the electrical power supplied to the battery exceeds a certain threshold. This threshold of supplied electrical power can be detected in particular by a current sensor, a hall effect sensor, a voltmeter, or an ammeter, which measure the current or voltage across the battery. A switchover to the second positive electrode 30 during charging is performed at the switches when a sudden upward variation in the current amplitude or voltage amplitude across the battery is detected.

Once the battery 200 is fully or partially Charged, with a charging method comprising two phases as described above, it can be used in the discharging phase.

Figure 4:
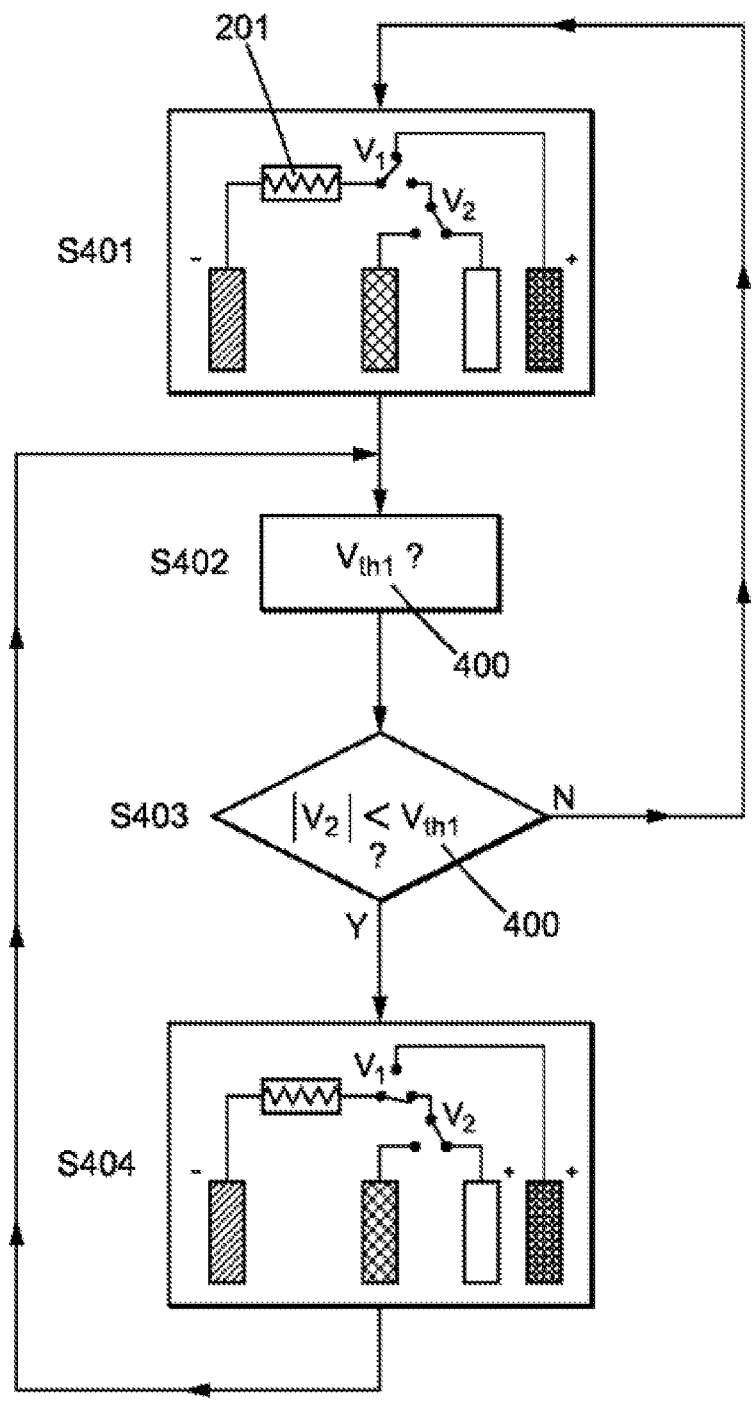
FIG. 4 is a flowchart representing a method for discharging a metal-air battery; making it possible to select a power electrode or a high-energy-density electrode according to the demand for power.

FIG. 4 illustrates a flowchart in which the circuit 201 consumes electrical energy delivered by the battery 200.

When the battery 200 is discharging, the third positive electrode 40 is rarely used and the second switch 220 connects the second positive electrode 30 to the positive terminal 203 of the circuit 201.

When discharging begins, it is possible to place the first switch 210 in a position which connects the first positive electrode 20 to the positive terminal 203 of the circuit 201. This is represented in step S401 in FIG. 4. The first positive electrode 20 consumes oxygen from the air to provide electrical power to the circuit. However, the rate of diffusion of air into the porous structure of the air electrode limits the maximum electrical power that the battery can deliver in this configuration.

To respond to larger demands for power, the invention proposes, in the discharging phase, determining an electrical power demand threshold of the circuit 201. When a power demand greater than the demand threshold is identified, the first switch 210 is activated in order to connect the second positive electrode 30 to the positive terminal 203 of the circuit 201 while disconnecting the air electrode.

As indicated in the flowchart of FIG. 4, the demand threshold may be a threshold voltage 400, Vth1. When the amplitude of the voltage V1 measured by the voltmeter 204 of FIG. 2 is greater than the threshold voltage 400, the discharging follows a first discharge operating mode using the air electrode on the positive terminal 203 of the circuit 201. When the amplitude of the voltage V1 is below the threshold voltage 400, the first switch connects the second positive electrode 30 to the positive terminal 203 of the circuit 201. This is represented by step S403 and S404 of FIG. 4.

In addition, FIG. 4 indicates that the threshold voltage is estimated in an intermediate step S402, and this occurs continuously. Indeed, the capacity of the battery to respond to a circuit's demand for power decreases as the battery discharges. The threshold voltage 400 may in particular be estimated from a comparison between the amplitude of a voltage measured between the negative electrode 10 and the first positive electrode 20, and the amplitude of a voltage measured between the negative electrode 10 and the second positive electrode 30.

Alternatively, the threshold voltage 400 may be estimated on the basis of measurements made during a first cycle of use during battery discharge, or else from numerical simulations carried out while taking into account the materials used in the electrodes of the battery.

The method described above may be implemented in particular by a control unit such as a BMS (for "battery management system").

In particular, it has been found that the electrical performance of the positive electrodes depends on their sizes. A thicker electrode offers a higher energy density due to the presence of a larger amount of material that can be converted in the oxidation-reduction reactions taking place in the battery, but offers lower power due to a greater electrical resistance. To find a rood balance between available power and power density, it is advantageous to provide a second positive electrode 30 whose energy capacity (expressed in $mAh/cm^2$) substantially corresponds to one third of the energy capacity of the negative electrode 10. This ratio offers good power and energy performance in a metal-air battery having a second positive electrode 30 of nickel oxide hydroxide in particular.

The charging and discharging cycles described above are repeated in a metal-air battery throughout its use. In this vein, FIG. 5 illustrates the voltage measured across a metal air battery composed of a cell as described above, during two successive charging/discharging cycles.

Figure 5:
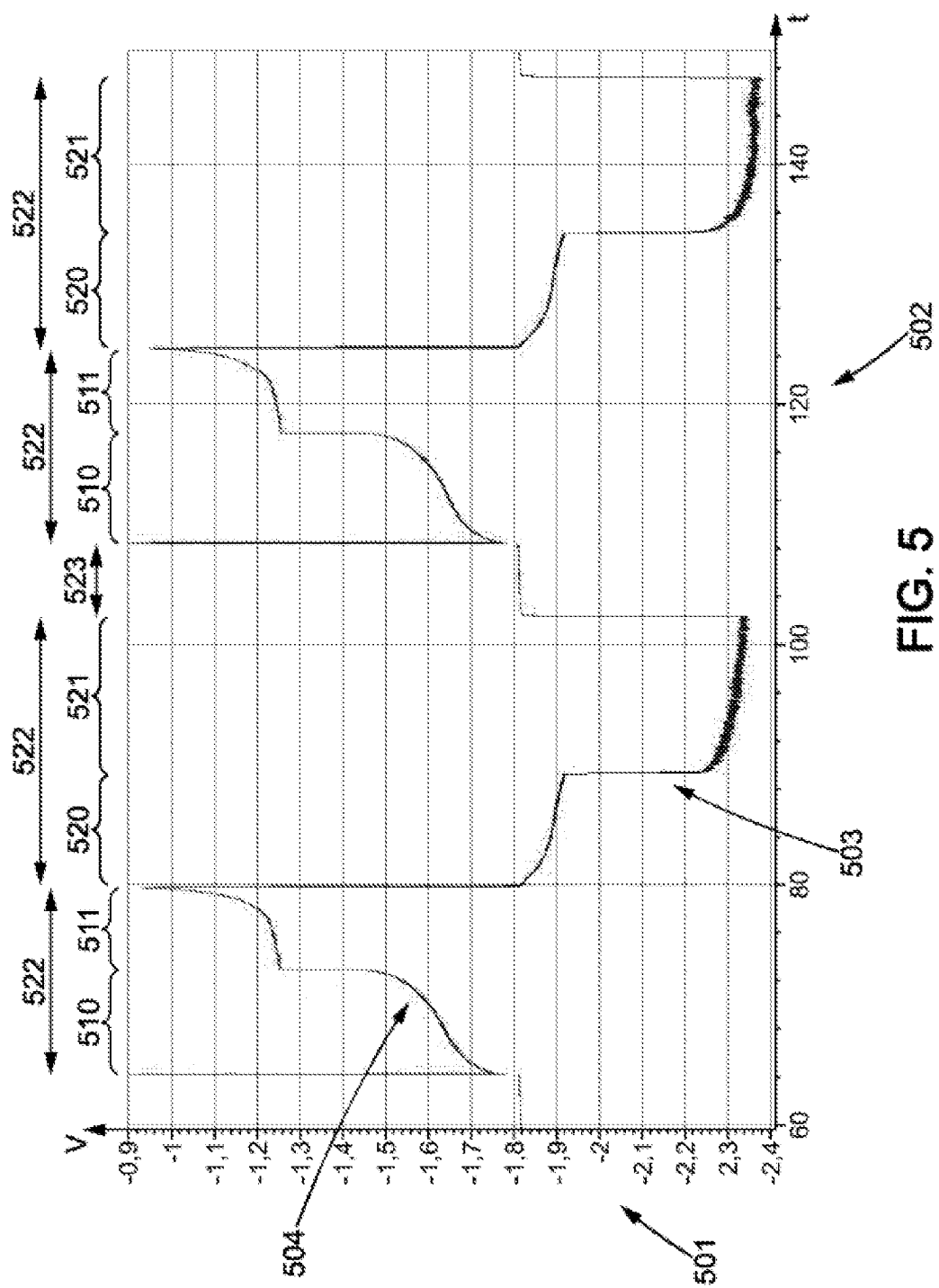
FIG. 5 is a graph showing the voltage measured over time across a metal-air battery according to the invention, during several charging and discharging cycles.

The vertical axis 501 of FIG. 5 represents the voltage measured at the terminals of the cell, the horizontal axis 502 represents the time in hours.

FIG. 5 comprises in particular a first cycle 512 at constant current during which the measured voltage amplitude progressively decreases. This first cycle 512 corresponds to a discharging cycle of the battery. The first cycle 512 is continuous and does not include any repeated switching between the air electrode and power electrode in order to respond to demands for power over time. It is quite possible, however, to discharge the battery with a very different voltage profile, when a demand for more power occurs at one or more moments in the discharging cycle. The first cycle 512 is subdivided into two operating modes: a second operating mode 510 during which the second positive electrode 30 is used, and a first operating mode 511 during which the first positive electrode 20 is used. The transition from the first operating mode to the second operating mode is marked by a significant and rapid decrease in the voltage amplitude 504. As shown by the curve of the changing voltage measured over time during the second operating mode 510, the power available on the second positive electrode 30 decreases as the battery discharges.

When the battery is discharged, a second cycle 522 begins. This is a charging cycle of the battery. In a first phase 520, the second positive electrode 30 is connected while the air electrode and the third positive electrode 40 are electrically inactive. When the measured voltage amplitude 503 reaches a threshold value (for example 1.9 V), the second oxidation reaction with oxygen production is about to begin on the second positive electrode 30. The second switch 220 then connects the third positive electrode 40 to the positive terminal of the circuit 201, while the air electrode and the second positive electrode are electrically inactive. This second charging phase 521 using the third positive electrode 40 protects the second positive electrode 30 from the negative effects of oxygen evolution.

It is possible that the battery remains inactive between two charging/discharging cycles, which is represented in FIG. 5 by a period 523 during which the measured voltage is the open circuit voltage at the end of charging the battery. The charging and discharging cycles then repeat as many times as necessary, until the battery needs to be replaced.

The invention also relates to a computer program product comprising a series of instructions stored on a storage medium for execution by a computer or a dedicated device, the program being configured to execute the method described above.

Figure 6:
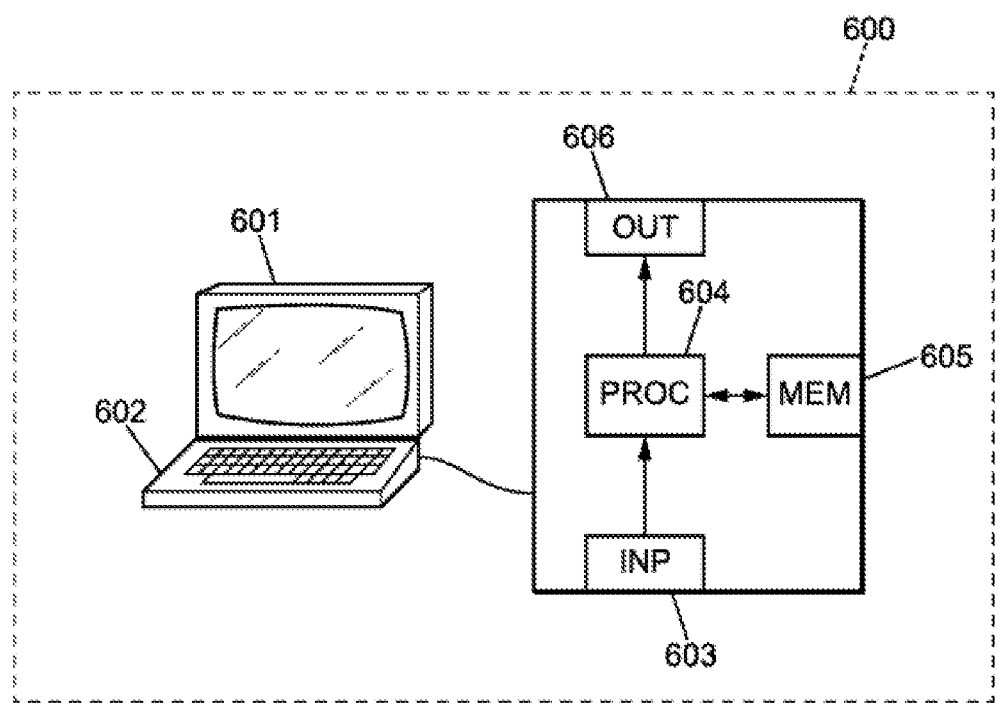
FIG. 6 is a schematic representation of a computer system that can be used to implement the method of the invention.

FIG. 6 shows an example of a computer system which allows running a computer program product comprising instructions implementing the method of the present invention.

In this embodiment, the device comprises a computer 600, comprising a memory 605 for storing instructions for implementing the method, the received measurement data, and temporary data for carrying out the various steps of the method as described above.

The computer further comprises a circuit 604. This circuit may be, for example:
a processor capable of interpreting instructions in the form of a computer program, or
a circuit board in which the steps of the method of the invention are defined in the silicon, or
a programmable electronic chip such as an FPGA chip (for "Field-Programmable Gate Array").

This computer has an input interface 603 for receiving measurement data, and an output interface 606 for providing commands controlling the evacuation device 607. Finally, the computer may comprise a screen 601 and a keyboard 602, to enable easy interaction with a user. Of course, the keyboard is optional, particularly in the context of a computer having the form of a touchscreen tablet for example.

The invention is not limited exclusively to the exemplary embodiments presented above which served to illustrate the invention. In particular, the materials used in the various electrodes are given for illustrative purposes only. A third positive electrode may in particular be used even when the second positive electrode is itself a metal grid and not a material comprising an oxide undergoing two different and successive oxidation reactions in the charging phase.

The invention finds applications in rechargeable metal-air batteries, and allows increasing their service life and their electrical performance. The improved management of the electrical energy passing through a metal-air battery according to the invention makes them usable in many systems, for example such as photovoltaic devices subject to voltage variations related to sunlight, or electric vehicles that consume and store variable electrical power related to the use being made of the vehicle and to the braking or acceleration conditions.

The invention claimed is:

1. A method for managing the electrical energy passing through a metal-air battery comprising at least one cell comprising:
   a negative electrode;
   a first positive electrode forming an air electrode of the cell; and
   a second positive electrode forming a power electrode of the cell;
   wherein, the cell further comprising an oxygen-evolution third positive electrode, the method comprises:
      applying a charging voltage to the cell during a first cell-charging phase, the charging voltage during the first cell-charging phase causing current to travel between the negative electrode and the second positive electrode, the first and third positive electrodes being electrically inactive;
      applying the charging voltage to the cell during a second cell-charging phase, the charging voltage during the second cell-charging phase causing current to travel between the negative electrode and said third positive electrode, the first and second positive electrodes being electrically inactive; and
      connecting the third positive electrode during the second charging phase, before oxygen is formed on the second positive electrode.

2. The method according to claim 1, wherein, the second positive electrode comprising an oxide of a metal in a given oxidation state, the method further comprises:
   switching from the first phase to the second phase upon detection of a change in the charging voltage.

3. The method according to claim 1, further comprising:
   at least during the first charging phase, measuring a voltage amplitude between the negative electrode and the second positive electrode,
   upon detecting a measurement of said voltage amplitude greater than a predetermined voltage threshold, disconnecting the second positive electrode and connecting the third positive electrode, in order to switch from the first charging phase to the second charging phase.

4. The method according to claim 3, wherein the voltage threshold is a voltage amplitude above which oxygen evolution occurs on the second positive electrode.

5. The method according to claim 1, wherein, for a discharging phase of the cell in which the negative electrode is connected to a negative terminal of an electric circuit in order to supply electrical energy to this electric circuit, the method further comprises:

obtaining information on the demand for electrical energy of said circuit, and based on the demand of the circuit, applying one of the following:
- a first operating mode for discharging the cell in which the first positive electrode is connected to a positive terminal of the electric circuit, and
- a second operating mode for discharging the cell in which the second positive electrode is connected to the positive terminal of the electric circuit.

6. The method according to claim 5, wherein the first operating mode corresponds to a supply of electrical power below a demand threshold of the circuit, and the second operating mode corresponds to a supply of electrical power above the demand threshold.

7. The method according to claim 6, further comprising:
measuring a voltage amplitude between the negative electrode and an electrode among the first positive electrode and the second positive electrode which is connected to the positive terminal of the circuit; and
when the voltage amplitude is above a predetermined threshold voltage, the threshold voltage being representative of a demand threshold of the circuit:
selecting the second operating mode, and
when the voltage is below the threshold voltage:
selecting the first operating mode.

8. The method according to claim 7, wherein the predetermined threshold voltage is estimated at regular time intervals based on a comparison between the voltage amplitude measured between the negative electrode and the first positive electrode and the voltage amplitude measured between the negative electrode and the second positive electrode.

9. A non-transitory computer program product comprising a series of instructions stored on a storage medium for execution by a computer or a dedicated device, said program being configured to execute the method according to claim 1.

* * * * *